United States Patent [19]

Schick

[11] Patent Number: 4,858,280

[45] Date of Patent: Aug. 22, 1989

[54] HINGE-PIN FOR COUPLING THE ENDS OF A CONVEYOR BELT OR THE LIKE

[75] Inventor: Jean-Francois Schick, Paris, France

[73] Assignee: Goro S.A., Chelles, France

[21] Appl. No.: 277,849

[22] Filed: Nov. 30, 1988

[30] Foreign Application Priority Data

Dec. 17, 1987 [FR] France .................. 87 17618

[51] Int. Cl.⁴ .............................................. F16G 3/02
[52] U.S. Cl. .................................. 24/33 B; 24/33 M; 24/33 P
[58] Field of Search .............. 24/33 B, 33 P, 33 M, 24/33 R, 31 R, 31 H; 474/204

[56] References Cited

U.S. PATENT DOCUMENTS

| | | | |
|---|---|---|---|
| 1,607,108 | 11/1926 | Whitehead | 24/33 B |
| 1,975,862 | 10/1934 | Olsen | 24/33 B |
| 2,145,455 | 1/1939 | Olsen | 24/33 B |
| 2,256,155 | 9/1941 | Smith | 24/33 BB |
| 2,962,782 | 12/1960 | Beach . | |
| 4,597,137 | 7/1986 | Droppleman et al. . | |
| 4,641,398 | 2/1987 | Schick | 24/33 B |

FOREIGN PATENT DOCUMENTS

| | | |
|---|---|---|
| 926645 | 4/1955 | Fed. Rep. of Germany . |
| 2240013 | 2/1974 | Fed. Rep. of Germany . |
| 2507474 | 12/1983 | Fed. Rep. of Germany . |
| 720857 | 2/1932 | France . |
| 2574510 | 6/1986 | France . |
| 162157 | 4/1921 | United Kingdom ............ 24/33 B |

Primary Examiner—Victor N. Sakran
Attorney, Agent, or Firm—Young & Thompson

[57] ABSTRACT

A hinge-pin for coupling two rows of belt-fasteners mounted to the ends of a belt-conveyor or the like is constituted by a series of metallic elements fitted in succession around a flexible axial core. Each element has the approximate shape of a semi-cylindrical rod and carries two projecting lugs at each end. These elements are placed on each side of the flexible core in two inverted rows and in staggered relation from one row to the next. The projecting lugs of both ends of each element are engaged in corresponding cavities of the opposite elements of the other row. The different elements disposed in succession are thus interengaged in the axial direction with a possibility of limited displacement of the elements in the other directions, thus endowing the hinge-pin with the requisite flexibility.

4 Claims, 2 Drawing Sheets

HINGE-PIN FOR COUPLING THE ENDS OF A CONVEYOR BELT OR THE LIKE

BACKGROUND OF THE INVENTION

1 Field of the Invention

The present invention relates to the devices employed for joining together two successive sections of a conveyor belt.

2. Description of the Prior Art

A joint of this type is usually formed by fitting two complementary series of metallic belt-fasteners on the ends of the two sections to be joined together, then coupling these two series of fasteners by means of a hinge-pin which is passed through the entire set of inter-engaged hinge-knuckles of these fasteners. The connecting hinge-pin employed for this purpose must be flexible in order to ensure that the corresponding conveyor belt can assume an inwardly curved transverse profile and thus take the shape of a trough on the belt-supporting rollers.

In consequence, said coupling hinge-pin usually consists of a cable made up of twisted wires. However, the mechanical resistance to wear of a hinge-pin of this type is relatively limited.

During recent years, a certain number of very effective solutions have in fact been devised for increasing the mechanical strength of the hinge-knuckles of the belt-fasteners since these hinge-knuckles previously constituted a weak point of the coupling devices thus formed. In consequence, it is now the connecting hinge-pin itself which constitutes the weak point of the assembly. In fact, the rubbing friction with which the hinge-knuckles of the belt-fasteners are applied on the periphery of a hinge-pin of this type very rapidly results in failure of one of the twisted wires. From this moment onwards, the hinge-pin becomes unserviceable in a very short time.

Moreover, as soon as one of the twisted wires is broken, the ends of the two resulting segments tend to become detached from the other wires and to spread out, thus practically prohibiting any possibility of disassembly of the corresponding hinge-pin. Now in the case of coupling devices employed on conveyor belts of the type used in coal mines, the belt-coupling devices frequently have to be disassembled in order to increase the length of the conveyor belts by incorporating an additional belt section. When the hinge-pin of a belt-coupling device cannot be disassembled, this makes it necessary to cut the ends of the conveyor-belt on each side and to mount new belt-fasteners on the ends without any possibility of recovering the old fasteners.

In order to overcome these disadvantages, a certain number of solutions have already been proposed but none has proved satisfactory. Thus U.S. Pat. No. 2,962,782 and French Pat. No. 720,857 describe hinge-pins constituted by a cable of twisted wires on which is fitted a protective outer sheath of flexible material. However, this design concept simply ensures protection of the corresponding pin but does not result in higher mechanical strength.

In regard to German Pat. Nos. 926,645, No. 2,240,013 and No. 2,507,474, they describe a hinge-pin constituted by a cable formed of twisted wires over which are threaded a series of metal sleeves arranged in succession. A solution of this type is better than the previous design since the metal sleeves thus provided have higher mechanical strength than a simple protective sheath of flexible material.

However, this solution remains imperfect. In fact, since the presence of the covering sleeves makes it necessary to reduce the cross-section of the axial cable, this latter has insufficient resistance to elongation. In point of fact, as soon as this cable is subjected to elongation under the action of stresses, there results a possibility of play between covering sleeves. This in turn has the effect of baring the axial cable between two successive sleeves and consequently of causing damage to this latter in the form of rupture of one or a number of twisted wires of the periphery.

As soon as a rupture of this type takes place, disassembly of the hinge-pin is no longer possible. However, for reasons already explained earlier, such disassembly is essential in order to permit periodic mounting of an extension band of the conveyor-belt when this latter is employed in a coal mine.

Moreover, in the event of complete rupture of the cable at an intermediate point of its length, it is impossible to remove the constituent elements of this latter in order to place a new coupling pin in position. In fact, since the metal sleeves are independent of each other, withdrawal of both cable segments does not make it possible to extract with each segment the sleeves which had been placed on the two segments. In consequence, any repair of the belt-coupling device calls for a certain number of relatively complicated operations before it is possible to withdraw all the elements of the damaged coupling pin in order to replace this latter by a new pin.

It is in any case by reason of these various disadvantages that this solution has not been applied on an industrial scale.

SUMMARY OF THE INVENTION

The object of the present invention is to construct a coupling hinge-pin of the type considered which is increased in mechanical strength to an optimum extent and in which all the constituent elements can nevertheless be extracted very readily in the event of damage so as to permit immediate replacement of said hinge-pin by a new pin.

To this end, the coupling hinge-pin in accordance with the invention is constituted by a series of metallic elements mounted one after another around a flexible axial core, said hinge-pin being distinguished by the fact that:

each of these elements assumes the shape of a semi-cylindrical rod adapted to carry at each end two lugs forming projections with respect to the diametral plane which delimits the corresponding element, a cavity (9, 9c) formed next to said lugs being intended to serve as a housing for the projecting lugs of an identical element placed on the element considered, said elements are placed on each side of the flexible core in two inverted rows and in staggered relation from one row to the other so that each element of a predetermined row is placed partly opposite to one-half of one element of the other row and partly opposite to one-half of another element which is adjacent to said other row, the projecting lugs of each end of each element are engaged within the corresponding cavities of the opposite elements of the other row, with the result that the different elements placed in succession are interengaged in the transverse direction with a possibility of limited relative displacement of said elements in the other directions, thus permitting the requisite flexibility of the coupling hinge-pin.

Said hinge-pin has extremely high mechanical strength since the elements distributed around its flexible core are massive and can be formed of metal having very high strength such as stainless steel or treated hardened steel which would not be suitable for forming the twisted wires of a coupling cable. However, by reason of the special arrangement of these elements and their interengagement in succession, said elements form a single-unit assembly which can readily be withdrawn from the hinge-knuckles of the belt-fasteners even if the flexible core has in the meantime disappeared during service. It should be noted in this connection that said core has no specific function in regard to the mechanical strength of the assembly since it is simply intended to permit initial assembly of the trough-shaped elements in succession.

DETAILED DESCRIPTION OF THE INVENTION

Figure 1:
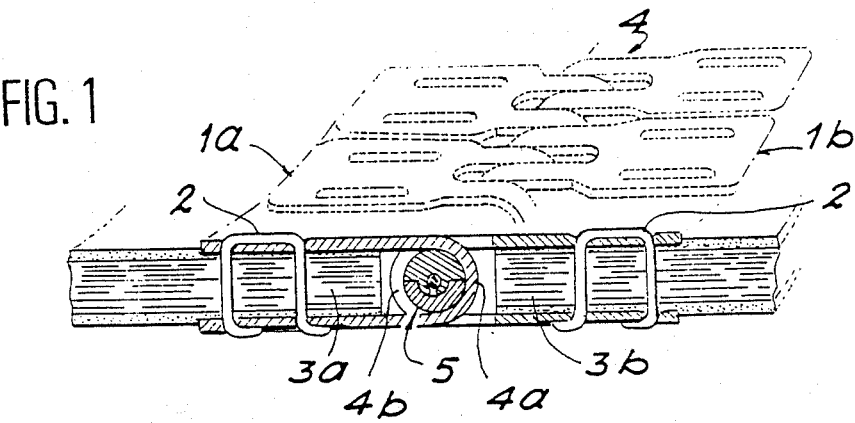
FIG. 1 is a view in cross-section and in perspective showing a coupling device comprising a coupling hinge-pin accordance with the invention.

As has already been mentioned, the coupling hinge-pin in accordance with the invention is intended to couple two complementary rows of metallic belt-fasteners 1a and 1b which are fixed by means of wire staples 2 on the ends 3a and 3b of a conveyor-belt. More precisely, said coupling hinge-pin is intended to be inserted in the passageway formed by the hinge-knuckles 4a and 4b of said belt-fasteners when these latter are interengaged as shown in FIG. 1.

The coupling hinge-pin is constituted by a series of metallic elements 5 fitted together in succession around a flexible core 6. In view of the fact that the core has no function which contributes to the mechanical strength of the hinge-pin considered, said core can be constituted by a twisted wire cable of very small cross-section or even by a monofilament or single-strand thread of synthetic resin or any other suitable material.

Figure 2:
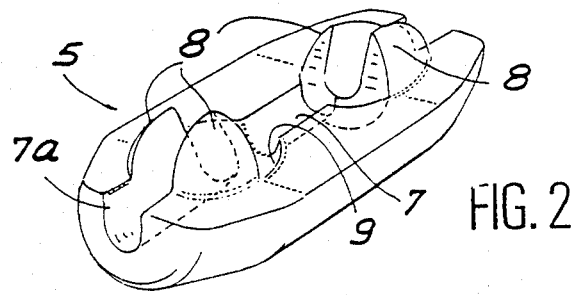
FIG. 2 is a view in perspective showing one of the constituent elements of said hinge-pin.
Figure 3:
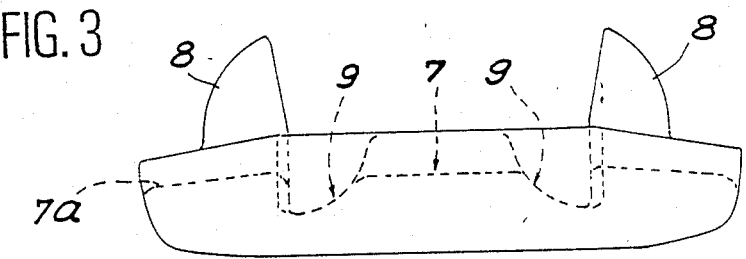
FIGS. 3 and 4 are views respectively in side elevation and in an overhead plan view, to a different scale.
Figure 4:
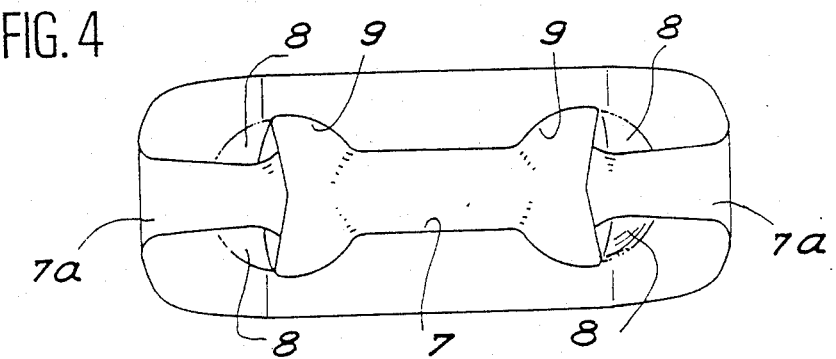

Each metallic element which is separately mounted on said core is designed virtually in the form of a massive rod of semi-cylindrical shape (as shown in FIG. 2). Two projecting lugs 8 set back with respect to each end and located opposite to each other form between them a passageway for the flexible core 6 and project at right angles with respect to the diametral plane which delimits the corresponding element.

However, these lugs have a rounded shape corresponding for example to a spherical segment in order to facilitate the movements of relative displacement of the elements 5 in succession as will be explained hereinafter. Next to each pair of projecting lugs 8, each element 5 is provided with a cavity 9 having a similar inwardly curved contour and intended to receive the lugs 8 of another identical element which is placed above in the inverted position with a relative displacement in the axial direction.

Between the two cavities 9, provision is made for an axial groove 7 which is intended to serve as a housing for the flexible core. The passageway provided for said core extends over the entire length of each element 5, the ends of which are provided with corresponding notches 7a. Thus each element is designed virtually in the form of a trough segment.

The elements thus provided are of small length, for example of the order of 10 to 20 mm in respect of a radius of approximately 3 mm whilst the flexible core has a diameter of the order of 1 to 2 mm. However, these dimensional values are mentioned only by way of example.

Figure 5:
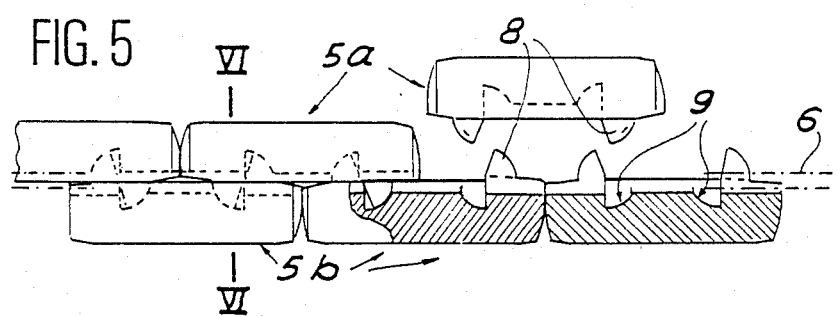
FIG. 5 is a partial view in side elevation with a cutaway portion of a hinge-pin constituted by elements of the type aforesaid.
Figure 6:
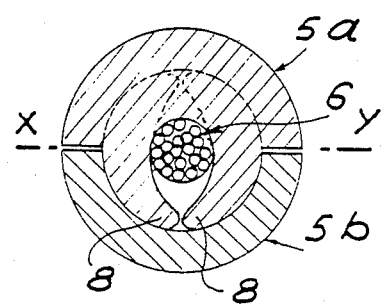
FIG. 6 is a transverse sectional view taken along line VI—V but to a different scale.

As shown in FIGS. 5 and 6, these elements are placed on each side of the flexible core 6 in two inverted rows an in staggered relation from one row to another. In order to differentiate them, the elements of one row are designated by the reference 5a whilst the elements of the other row bear the reference 5b. The relative displacement between the two rows is such that each element of a predetermined row is placed partly opposite to one-half of an element 5 of the other row and partly opposite to one-half of another adjacent element 5 of said other row.

At the time of assembly of these elements, the projecting lugs 8 of the elements 5a of the corresponding row are caused to penetrate into the cavities 9 of the opposite elements 5b of the other row, and conversely. Now the dimensions are such that this penetration has to be carried out by forcible engagement, thus causing the ends of the two lugs 8 of each pair to bend towards each other. This ensures clamping of said lugs around the flexible core 6 as shown in FIG. 6.

Taking into account the fact that the lugs 8 of each element 5a are engaged within the cavities 9 of the two successive elements 5b opposite to which said element 5a is placed and that the same applies to each element 5b, the elements of both rows are thus interengaged in succession in the axial direction. These elements accordingly constitute a single-unit assembly, even in the event of subsequent disappearance of the flexible core 6.

Figure 7:
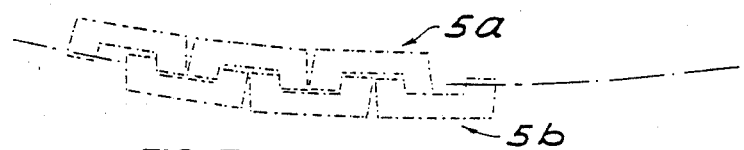
FIG. 7 is a partial view in elevation illustrating one of the possibilities of incurvation or "troughing" of the hinge-pin considered.

However, the elements 5a and 5b have a certain freedom of relative displacement with respect to each other in all directions other than the axial direction. Thus, as shown in FIG. 7, these elements are capable of slight displacement with respect to the diametral plane X-Y of superposition of the two rows. However, they are also capable of slight displacement with respect to the axial plane at right angles to said diametral plane. It will be readily apparent that they can also carry out any other complex movement of displacement. This possibility of relative displacement of the elements 5 with respect to each other accordingly ensures the requisite flexibility of the hinge-pin thus formed so as to permit inward bending or "troughing" of the conveyor-belt on the carrier rollers.

Moreover, the special shape of the projecting coupling lugs 8 and of the cavities 9 for receiving these latter facilitates the movements of relative displacement of the elements 5a and 5b. In fact, by virtue of this special shape, the lugs 8 are capable of pivotal displacement in all directions within the cavities 9.

The industrial manufacture of the hinge-pin under consideration does not give rise to any particular problem since it is only necessary to ensure that the two opposite rows of elements 5a and 5b are assembled together on each side of the flexible core 6 while maintaining the requisite relative displacement. As can readily be understood, an element 5 of a particular type having a length reduced by one-half or a special end-fitting should be placed in position at each end of the hinge-pin.

It is worthy of note that the flexibility of the hinge-pin considered is ensured solely by the possibility of relative displacement of the various elements 5. In consequence, it is not necessary to provide inherent flexibility of the elements themselves, which would not permit the construction of said elements in a massive form and of metal having very high resistance.

Now by virtue of the fact that the elements 5 are formed of metal having very high resistance, the present hinge-pin has high mechanical strength, with the result that it is capable of affording effective resistance to the wear caused by repeated friction of the hinge-knuckles 4a and 4b of the corresponding belt-fasteners 1a and 1b. In consequence, the service life of said hinge-pin is much longer than that of the hinge-pins at present employed for coupling belt-fasteners. Nevertheless, in the event of damage to said hinge-pin, this latter can be withdrawn with great ease even if it has failed at an intermediate point of its length. In fact, since all the elements 5a and 5b are interengaged in succession, it is possible to extract the entire assembly of elements by applying a tractive force on the elements located at the ends of the hinge-pin even if the flexible core 6 no longer exists.

Interengagement of the elements 5 in succession offers a further important advantage in the fact that, during the period of utilization of the coupling hinge-pin under consideration, separation of two successive elements is not liable to occur under the action of pressure exerted by the hinge-knuckles 4a and 4b of the belt-fasteners and there is consequently no attendant danger of damage to the hinge-pin considered.

Figure 8:
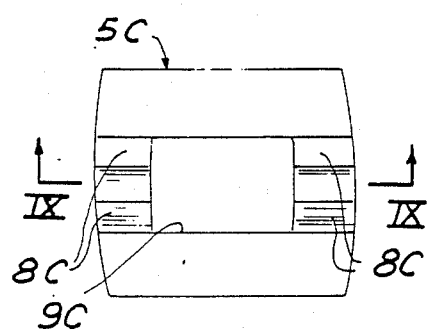
FIG. 8 is an overhead plan view of another embodiment of the constituent elements of the hinge-pin in accordance with the invention.
Figure 9:
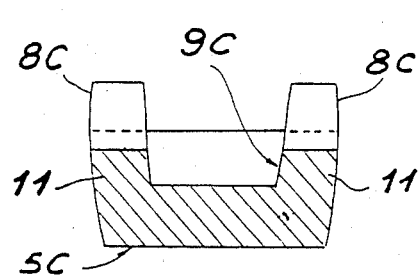
FIG. 9 is a sectional view taken along line IX—IX of FIG. 8.
Figure 10:
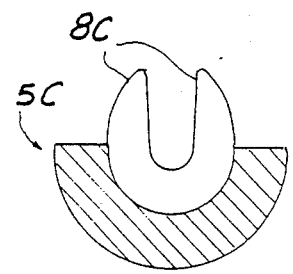
FIG. 10 is a sectional view taken along line X—X of FIG. 9.

In the example shown in FIGS. 1 to 7, the present hinge-pin is fabricated by die-stamping, thus making it possible to provide the special shapes contemplated in these figures for the lugs 8 and the cavities 9. However, as illustrated in FIGS. 8 to 10, these elements could also be fabricated from cut-out and bent sheet metal. In such a case, the projecting lugs 8c of each corresponding element 5c would be located at the very ends of said element above a terminal flange 11. At the time of assembly of these elements in the form of two oppositely-acting rows, it is necessary to maintain the same relative displacement as before in order to ensure that the projecting lugs 8c of each element come into position within the cavity 9c of the element which is placed opposite. In the same manner as in the previous case, the dimensions of the different parts are such that this forcible assembly has the effect of clamping the ends of the lugs 8c around the corresponding flexible coupling core 6.

As in the previous instance, interengagement of all the elements 5c in succession is achieved since the lugs 8c are retained by the end flanges 11. However, there is also a possibility of slight relative displacement in all directions other than the axial direction. This accordingly makes it possible to obtain a hinge-pin which has very high mechanical strength while at the same time having the necessary flexibility for permitting subsequent troughing of the corresponding conveyor-belt.

However, many other alternatives can be contemplated for the construction of the hinge-pin under consideration. As mentioned earlier, this hinge-pin is intended to be employed for coupling two complementary rows of belt-fasteners which have previously been fitted on the ends of a conveyor-belt or the like.

By reason of its very high mechanical strength, the coupling hinge-pin has a much longer service life than the hinge-pins which had been employed up to the present time for the same application. Furthermore, it can be employed without difficulty in highly abrasive media.

What is claimed is:

1. A hinge-pin for coupling two rows of fasteners fitted on a conveyor belt or the like at the ends to be joined together, said hinge-pin being constituted by a series of metallic elements mounted one after another around a flexible axial core, wherein:

each element aforesaid assumes the shape of a semi-cylindrical rod adapted to carry at each end two lugs forming projections with respect to the diametral plane which delimits the corresponding element, a cavity formed next to said lugs being intended to serve as a housing for the projecting lugs of an identical element placed on the element considered, said elements are placed on each side of the flexible core in two inverted rows and in staggered relation from one row to the other so that each element of a predetermined row is placed partly opposite to one-half of one element of the other rows and partly opposite to one-half of another element which is adjacent to said other row, the projecting lugs of each end of each element are engaged within the corresponding cavities of the opposite elements of the other row, with the result that the different elements placed in succession are interengaged in the transverse direction with a possibility of limited relative displacement of said elements in the other directions, thus permitting the requisite flexibility of the coupling hinge-pin.

2. A coupling hinge-pin according to claim 1, wherein the projecting lugs of each trough-shaped element are initially perpendicular to the diametral plane which delimits said element and, after assembly of each element with the two respective elements of the other row, the lugs of said element are clamped around the flexible core by virtue of their forcible penetration within the cavities of said elements.

3. A coupling hinge-pin according to claim 1, wherein the projecting lugs of the ends of each trough-shaped element are slightly set back with respect to the corresponding end.

4. A coupling hinge-pin according to claim 1, wherein the projecting lugs of the trough-shaped elements as well as the cavities for receiving said lugs have a profile which facilitates relative displacement of said elements in all directions other than the axial direction.

* * * * *